United States Patent [19]

Chemali et al.

[11] Patent Number: 5,446,654
[45] Date of Patent: Aug. 29, 1995

[54] SHOULDER EFFECT LOGGING METHOD

[75] Inventors: Roland E. Chemali, Houston; David O. Torres, Austin, both of Tex.

[73] Assignee: Halliburton Company, Houston, Tex.

[21] Appl. No.: 914,076

[22] Filed: Jul. 16, 1992

[51] Int. Cl.$^6$ .................... G06F 17/00; G01V 3/10; E21B 47/00
[52] U.S. Cl. .................... 364/422; 324/338; 324/339; 73/151; 367/15
[58] Field of Search .................... 364/422, 421, 420; 324/338, 339, 340, 343; 73/151; 367/25, 33

[56] References Cited

U.S. PATENT DOCUMENTS

| | | | |
|---|---|---|---|
| 4,471,436 | 9/1984 | Schaefer et al. | 364/422 |
| 4,484,278 | 11/1984 | Edmundson | 364/422 |
| 5,095,272 | 3/1992 | Sinclair | 324/339 |
| 5,105,356 | 4/1992 | Maute et al. | 364/422 |
| 5,146,167 | 9/1992 | Strickland et al. | 324/339 |

OTHER PUBLICATIONS

Turner, K. et al, *A New Algorithm for Automatic Shoulder Bed Correction of Dual Laterolog Tools*, SPWLA 32nd Annual Logging Symposium, Jun. 16–19, 1991.

Crary, S. F. et al, *The Use of Electromagnetic Modeling to Validate Environmental Corrections for the Dual Laterolog*, SPWLA, 31st Annual Logging Symposium, Jun. 24–27, 1990.

Cosmo, C. et al, *Fast Deconvolution of Laterologs By Direct Inverse Filtering*, SPWLA, 32nd Annual Logging Symposium, Jun. 16–19, 1991.

Chemali, R. et al. *The Shoulder Bed Effect on the Dual Laterolog and Its Variation with the Resistivity of the Borehole Fluid*, SPWLA, 24th Annual Logging Symposium, Jun. 27–30, 1983.

Gianzero, S. C. et al. *A New High-Speed Hybrid Technique for Simulation and Inversion of Resistivity Logs*, 60th Annual Technical Conference and Exhibition of the Society of Petroleum Engineers, Las Vegas, Nevada, Sep. 22–25, 1985.

Coggon, J. H., *Electromagnetic and Electrical Modeling by the Finite Element Method*, Geophysics, vol. 26, No. 1, pp. 132–155, Feb. 1971.

*Primary Examiner*—Gail O. Hayes
*Assistant Examiner*—Khai Tran
*Attorney, Agent, or Firm*—Arnold, White & Durkee

[57] ABSTRACT

In a resistivity log, a curve is obtained showing the values of resistivity where adjacent beds impact the measured resistivity. The curve as a function of well depth is first converted into a rectangularized curve so that the interfaces of the adjacent strata are located, and by a suitable number of iterations, a correction factor is applied. The corrected rectangular log is obtained with a correction coefficient computed at each depth. For each computation, the impact of all the strata within a specified depth window is considered, while strata beyond that window are simplified by representing the strata beyond the window with single equivalent bed values to reduce the number of computations required. This then provides a resistivity log which is substantially free of shoulder bed effect.

3 Claims, 3 Drawing Sheets

SHOULDER EFFECT LOGGING METHOD

BACKGROUND OF THE INVENTION

The present invention relates to well logging tools and in particular to a logging tool for measuring formation resistivity known as the laterolog system. This is a device which utilizes a current injecting electrode on a sonde typically bracketed by current steering electrodes on the sonde which cause current to be steered radially outwardly from the sonde into adjacent formations. It is intended to measure formation resistivity of the formations immediately adjacent to a well borehole through which current flows.

The logging apparatus of this disclosure involves the injection of current radially outwardly from a sonde in a well borehole. The current flow is measured, and along with measurements of voltages at various locations on the sonde, a method of determining formation resistivity or its reciprocal which is conductivity is then obtained. Moreover, such devices provide a valuable indication of formation resistivity which resistivity values are regrettably interdependent on the geometry and uniformity of adjacent formations. If at a given instance the sonde positions such an electrode for injecting current radially outwardly into a formation which is extremely thick and relatively uniform in resistivity, then the measured resistivity of the formation is substantially accurate in view of the geometry of the formation. However, this is an ideal situation which does not always hold true. Consider the example of an interface between two large; or thick formations which have markedly different resistivity measurements. In the area of the interface, the resistivity measured for one formation will be modified by the resistivity of the adjacent formation. Consider another situation where the formations are quite thin, and there is therefore an interface above the current injection point and another interface below the current injection point. This then involves the formations which are above and below the formation immediately adjacent to the tool at which current is injected.

The adjacent formations have an impact on the data which is described generally as the shoulder bed effect, and the extent thereof depends on a number of parameters including the contrast between the resistivity of the surrounding beds, the distance along the well borehole from the current injection point to the respective beds above and below, the respective thicknesses of the formations or beds which are above and below, the diameter of the borehole, the conductivity of the fluid in the borehole, and other variables. In fact, because there are difficulties in sorting out these several variables, it has been the practice over the last few years to develop correction charts which take into account certain combinations of some, but not necessarily all of these parameters. As FIG. 1 of the drawings of the present disclosure will show, the borehole diameter and the ratio of resistivity between the borehole fluid and the shoulder beds are fixed variables for construction of that chart. The correction derived from the chart is carried out for a particular set of parameters fixed in accordance with the particular chart. This however requires separate charts to be computed for a large variety of combinations of hole diameter and the resistivity ratio. Even then, the charts are not totally effective. They are not effective because the ratios in the charts presume uniform and identical shoulders. The circumstances of the presumptions occur only rarely. The more common occurrence is that the formations are not uniform, and they may in fact be quite thin. Moreover, the shoulder beds above and below the current injection point may be similar but they may be radically different. The correction chart approach to reducing the number of variables is not totally effective.

The trade name SHOLAT identifies an algorithm which uses cumulative sequential resistivity steps, advancing a number of incremental steps, and provides a measure of simplification. With this simplification, there is a level of error derived from the basic assumptions. The assumptions are substantial and thus the inaccuracy of this approach becomes substantial in some circumstances.

In the present approach, certain assumptions are used which are more true to form. One of the first assumptions is that the log may be rectangularized. This requires that the advent of a particular zone or formation be observed and that assumed values be assigned to it which are uniform across that zone bed or formation. That assumption is thus applied to the full thickness of the particular bed.

In order to rectangularize the log, each given zone, bed, or formation, is assigned a uniform resistivity. This assigned resistivity is equal to the maximum measured resistivity in that zone if both adjacent zones (upper and lower) are less resistive. The assigned resistivity is equal to the minimum measured resistivity in that zone if both adjacent zones (upper and lower) are more resistive. Finally the assigned resistivity is equal to the average measured resistivity within the zone if one of the adjacent zones is more resistive and the other adjacent zone is more conductive.

Once the log is rectangularized, the response of the laterolog or other electrode tool is computed at the center of each zone using an exact computer model such as the Finite Element Model, or the Hybrid Method. A correction factor is then derived as the ratio of the assigned zone resistivity to the computed tool response. This correction factor takes into account the borehole fluid and diameter as well as the shoulder beds. In theory, further iterations should be performed whereby the shoulder bed resistivity is continuously replaced by the corrected value. In practice however, the process converges after only one or two iterations.

An important step of the presently disclosed method is simplification of more remote shoulder beds. For instance, if the current injection point, typically known as the measure point on the tool, is located at any particular instant, the beds which have the most impact are those that are within a specified vertical spacing. That vertical spacing can be arbitrarily defined as any particular range but it is a vertical distance of several feet. Sixty feet typically defines the region in which the formation resistivities have the most impact. Iterative processing in the rectangularization of the present data to obtain a match between the actual measurements and the iteratively processed data is a computing intensive protocol. The present method proposes to reduce the amount of processing by making simplifying assumptions for shoulder beds which are remote, that is those which are beyond the zone of interest which is arbitrarily defined in thickness. Accordingly, and again using the measure point on the tool, beds which are beyond 20 or perhaps 30 feet from the measure point can be collectively grouped and represented as a single value, and individual bed values are thus averaged. This cuts down on the number of beds required for computational purposes. Again and assuming a very simplistic example, assume that the measure point is at a particular location and beyond that measure point, there are a large number of beds located from 30 to 100 feet along the well borehole from the measure point. Those beds beyond 30 feet are grouped into an average value to reduce computational effort.

While the interface between adjacent formations of different resistivity may be located, the measured resistivity from a given formation may be in substantial error compared with the true resistivity of the formation as a result of the other formations. In other words, the absolute measure of resistivity may be in error, and the amount of error depends on the nature of the adjacent formations. In summary fashion, this error is dependent upon the contrast in the resistivity of the two formations. It also is dependent on the distance to the respective beds and their respective thicknesses. Another factor can be the diameter of the borehole and the conductivity of the drilling fluid that is in the well borehole. FIG. 1 of the drawings shows the borehole diameter and the resistivity ratio. A correction is carried out by entering the chart with the thickness measured for the bed of interest and the resistivity ratio of the shoulder bed. Quite obviously, this requires an individual chart for every combination of hole diameter and ratio of the respective resistivities. The trouble with the ratio determinations is that most of the ratios are derived from measurements involving highly monolithic, massive and identical strata so that the ratio aspect of the correction chart is idealized, and is therefore accurate only in unusual circumstance. Since shoulder beds are generally a sequence of several individual formations of mixed thicknesses and differing resistivities, the chart is idealized and incapable of dealing with the more common and practical aspects of the matter. Correction by means of a computer implemented algorithm SHOLAT was evaluated in the recent publication of Crary, et al, see "The Use of Electromagnetic Modeling to Validate Environmental Corrections for the Dual Laterolog" SPWLA Symposium Transactions, 1990.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 2:
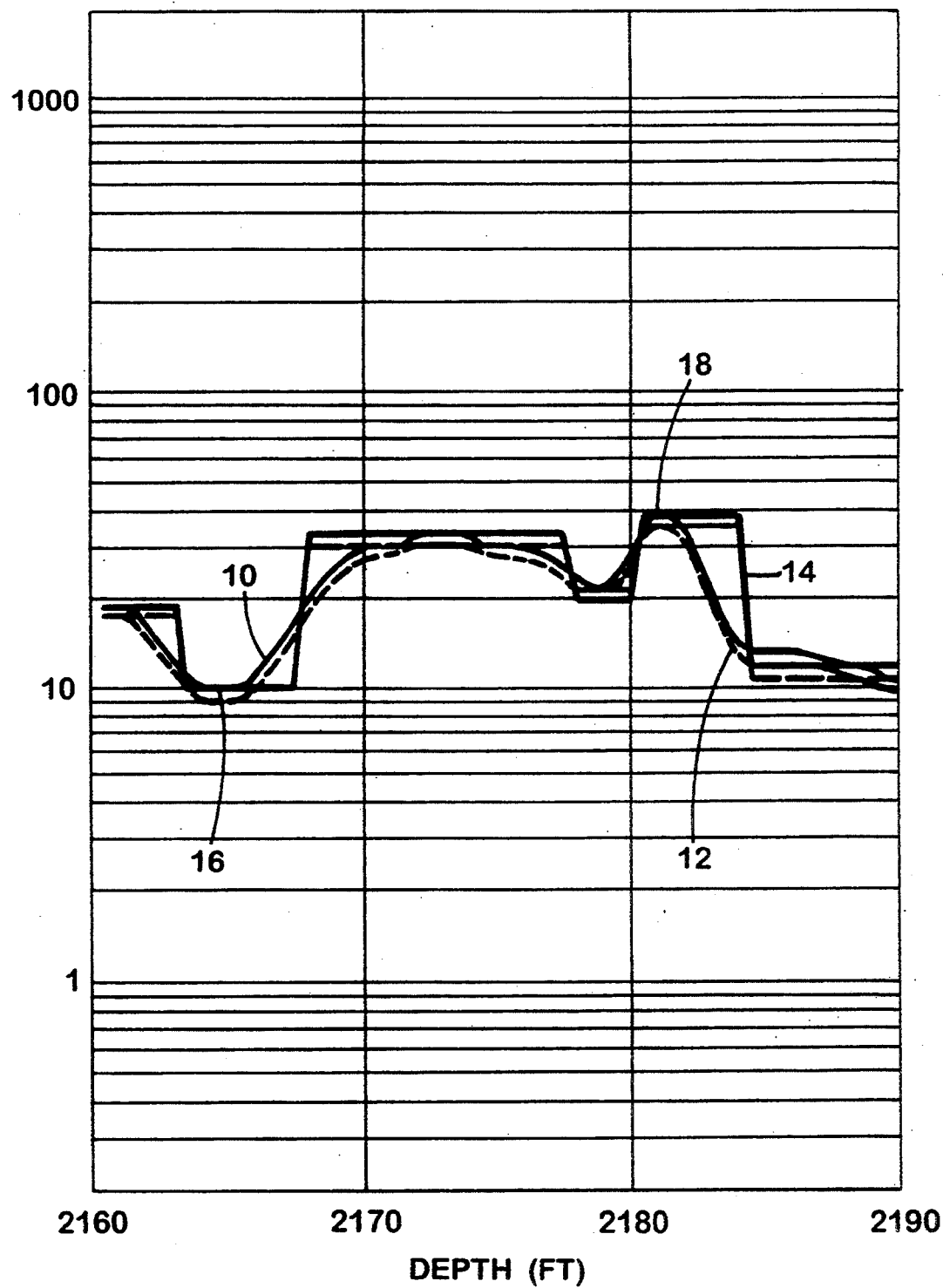
FIG. 2 shows an intermediate step in the procedure of the present disclosure in which the log is converted into a rectangular or overdriven log for purposes of emphasis of interfaces between adjacent beds.

For purposes of description, assume that a conventional resistivity log has been obtained along the length of a well borehole. Further, assume that the curve provides sufficient inflection that the interfaces between adjacent formations can then be found on the log. Attention is therefore directed to FIG. 2 of the drawings which shows several curves. As data is received and processed, the original curve 10 is recorded as a function of well depth. The numeral 12 identifies the corrected curve from the well. The ordinate of FIG. 2 shows the resistivity, spanning four orders of magnitude. As will be observed, the curve ranges from a resistivity of about 10 almost to 40 ohms. In any case, the curve 10 is overdriven, forming a rectangular exaggeration so that the interface between adjacent beds is appropriately accented and identified by the curve inflection. The rectangular curve is indicated at 14. This curve helps locate the interfaces as mentioned. For instance, there is an interface at a depth of about 2181' which is made sharper by the overdriven rectangular waveform.

Figure 1:
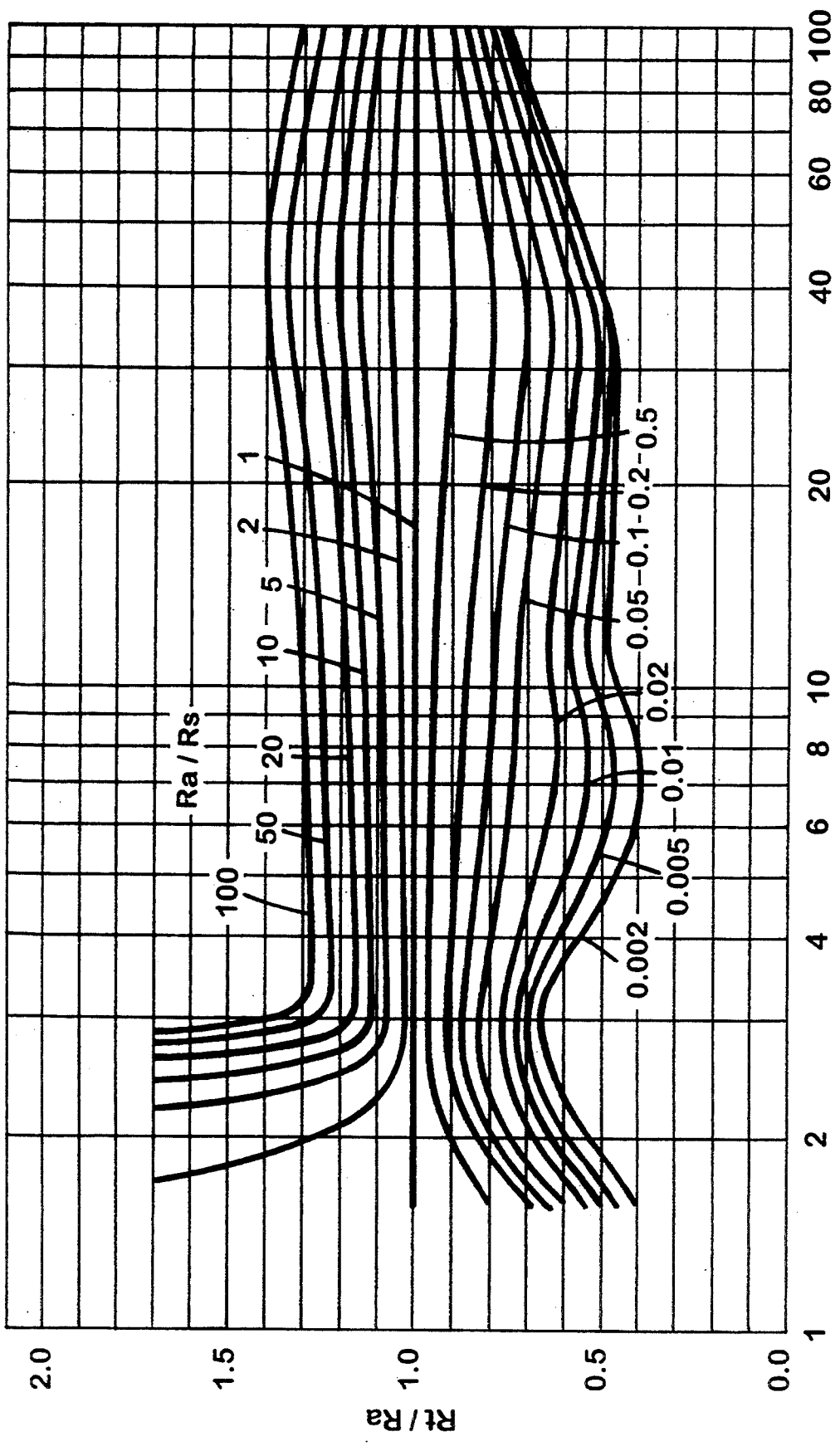
FIG. 1 is a chart showing correction factors used in the prior art involving borehole diameter and the ratio of resistivity between the borehole fluid and shoulder bed.

The ordinary approach is to use the family of curves shown in the graph of FIG. 1. Note however this graph approach is avoided by resort to the more generalized approach which is shown in FIG. 2. The graphic representation of FIG. 1 has a specific presumed resistivity ratio and a borehole diameter of 8 inches. An entirely different set of curves is necessary if the ratio is different or if the diameter is different. While the number of diameter measurements is reasonably finite, the resistivity ratios are in theory more numerous, and hence, the number of graphs corresponding to FIG. 1 is a very large number. Even where only two or three borehole diameters are used, it still requires a very large number of graphs made in the fashion of FIG. 1.

This present procedure contemplates as a next step the determination of the resistivity at the center point of a particular bed. The numeral 16 identifies such a center point. This point on the curve 10 shows a measure of 10 while the maximum value is at the point 18 where the resistivity measurement is almost 40, perhaps 37. These values are momentarily assumed to be correct. The values of 10 and 37, found at the centers of the beds, are used to define the resistivity values for the full thickness or width of the beds. The measurement at 16 is extended so that the curve is converted into a rectangle having a value of 10 across the thickness of the bed. Here, the bed is approximately 4 feet in thickness as evidenced by the rectangular wave form imposed in FIG. 2. In similar fashion, the maximum measure of 37 is attributed to a formation thickness of about 4 feet, and that value is assigned as shown in FIG. 2, thereby extending the point 18 for the entire bed spanning the depth range of 2181' to about 2185'. The solid lines shown in FIG. 2 show the values obtained by conversion into the rectangular or overdriven signal.

As will be observed, the resistance value at 10 at the peak 16 is maintained through two or three iterations, but the value of 37 at the peak 18 is adjusted slightly by the iterative correction process. As shown, the resistivity is reduced to about 36. The modest change shows the impact of a few iterations. Continued iterations may provide ultimately a slightly better representation of the several strata which are penetrated by the borehole.

Figure 3A:
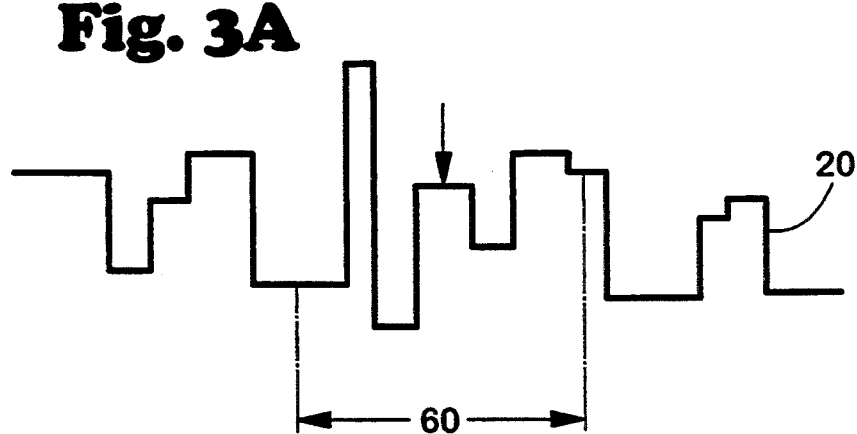
FIG. 3 shows a rectangularized log at the top where the number of strata is reduced by simplification as shown in the bottom curve.
Figure 3B:
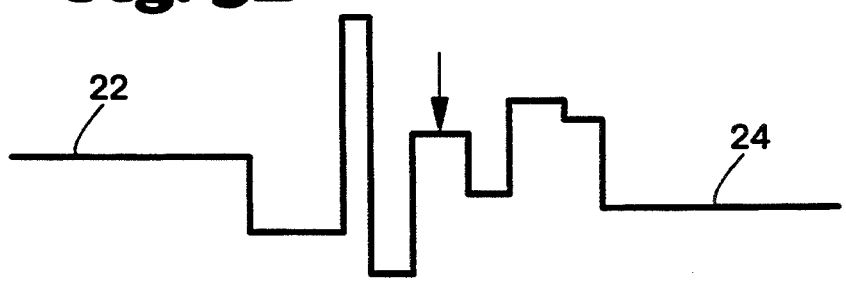

The tool is sensitive to strata which are above and below the range of investigation. This vertical range of sensitivity decreases with distance. Using an arbitrary distance of 60 feet centered at the tool measure point, the calculations involved in the iterative process are markedly reduced by eliminating formations outside the vertical window of 60 feet centered on the measure point of the tool. FIG. 3 shows an example of this. Assume for purposes of discussion that the top curve 20 is obtained by rectangularizing the curve 20. Since any strata within the sixty foot window is more important than those outside the window, and the remote strata are significantly less important, that portion of the curve beyond the 60 foot window is then represented as a single value. This is shown in the second curve where the line segments 22 and 24 represent the simplifications obtained by converting all the strata beyond the 60 foot window into single values. This reduces processing. The values at 22 and 24 are equivalent bed values for the numerous beds beyond the window of 60 feet in the top curve. Suitable numerical simulations indicate that the resistivity of the equivalent bed (meaning the values 22 and 24 as shown in FIG. 3) as given by the equation:

$$Log(R_{eq}) = \left( \Sigma_i \frac{LogR_i}{(Z_iZ_0)^2} \right) \Big/ \left( \Sigma_i \frac{1}{(Z_iZ_0)^2} \right)$$

where $R_i$ is the log reading at depth $z_i$. The sonde measure point is at $Z_0$, and the summation is over the depth outside the window. In the foregoing equation $R_i$ is the log value at the depth $Z_i$. With the sonde located at the measure point identified at $Z_0$, the summation is carried out over the plotted log beyond or outside the specific window (meaning the 60 foot window). Obviously, that window width can be different to accommodate different scale factors.

Figure 4:
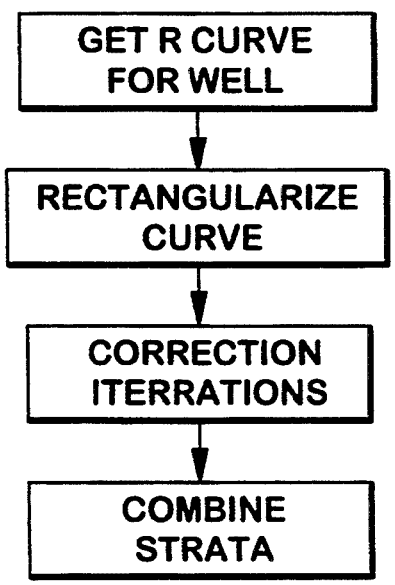
FIG. 4 shows a flow chart.

The present procedure thus applied after the log has been obtained in the conventional fashion, and is carried out by converting in accordance with the flow chart shown in FIG. 4 of the drawings. The steps shown there are discussed above.

While the foregoing is directed to the preferred embodiment, the scope thereof is determined by the claims which follow:

We claim:

1. A method of logging a wellbore in a reservoir, said method comprising the steps of:
   using a conveying system to move a logging device along said wellbore;
   using said logging device to generate first electrical signals correlative to resistivity of said reservoir along a portion of the wellbore;
   using said conveying system to generate second electrical signals correlative to depth of said logging device in said wellbore;
   electrically plotting said first electrical signals versus said second electrical signals to produce a log of resistivity versus depth; and
   electrically modifying said log to correct for shoulder bed interference to generate a corrected log by:
      rectangularizing said log using a programmed computer, wherein said computer selects a transition between adjacent zones of said reservoir and assigns a respective resistivity value to each respective zone, each assigned resistivity value corresponding to one of a maximum resistivity measured in said respective zone, a minimum resistivity measured in said respective zone, and an average resistivity measured in said respective zone, depending on measured resistivity values of zones adjacent said respective zone;
      computing a respective first correction factor for each respective zone using said resistivity values from said rectangularized log and using a respective first assumed cumulative resistivity value for zones which are beyond about thirty feet above the center of said respective zone and a respective second assumed cumulative resistivity value for zones which are beyond about thirty feet below the center of said respective zone; and
      using said first correction factors to generate said corrected log having corrected resistivity values.

2. The method of claim 1 wherein said step of modifying further comprises the steps of:
   computing a respective second correction factor for selected respective zones using said resistivity values from said rectangularized log and using said first corrected resistivity values for zones within about thirty feet of said selected respective zones; and
   using said first and second correction factors to generate said corrected log having corrected resistivity values.

3. The method of claim 1 wherein said first and second assumed cumulative resistivity values are calculated using the following equation:

$$Log(R_{eq}) = \left( \Sigma_i \frac{LogR_i}{(Z_iZ_0)^2} \right) \Big| \Sigma_i \frac{1}{(Z_iZ_0)^2}$$

where:

$R_i$ is the log reading at depth $Z_i$;
$Z_0$ is the measurement point where the logging device is located, and
$R_{eq}$ is either the first or second assumed cumulative resistivity value.

* * * * *